United States Patent [19]

Inamura et al.

[11] 4,228,944
[45] Oct. 21, 1980

[54] METHOD OF BONDING SUBSTRATES MADE OF METAL OR ALLOY

[75] Inventors: Minoru Inamura; Noboru Takeuchi; Kazuhiro Inukai; Kentaro Taninouchi; Shin Utsunomiya, all of Amagasaki, Japan

[73] Assignee: Mitsubishi Denki Kabushiki Kaisha, Tokyo, Japan

[21] Appl. No.: 954,284

[22] Filed: Oct. 24, 1978

[30] Foreign Application Priority Data

Oct. 31, 1977 [JP] Japan .................. 52/131139

[51] Int. Cl.³ .................. B23K 1/04; B23K 25/00
[52] U.S. Cl. .................. 228/198
[58] Field of Search .................. 228/193, 194, 195, 198

[56] References Cited

U.S. PATENT DOCUMENTS

| | | | |
|---|---|---|---|
| 3,069,765 | 12/1962 | Simpelaar | 228/198 |
| 3,263,325 | 8/1966 | Jacobson | 228/194 |
| 3,276,113 | 10/1966 | Metcalfe | 228/194 |

OTHER PUBLICATIONS

Inamura et al., "Brazing Procedure and Inspection of Contact Chip for Power Circuit Breaker", *2nd International Symposium of the Japan Welding Society*.
Duvall et al., "TLP Bonding", *Welding Journal*, 1974 (Apr.), pp. 203–214.

*Primary Examiner*—Francis S. Husar
*Assistant Examiner*—K. J. Ramsey
*Attorney, Agent, or Firm*—Oblon, Fisher, Spivak, McClelland & Maier

[57] ABSTRACT

Substrates made of a metal or an alloy are bonded by coating a brazing flux incorporating a metallic powder or a metal compound powder on the surface of the substrate having a melting point of higher than 700° C.; and heating them at a temperature higher than a melting point of the flux but lower than a melting point of the metal of the metallic powder or the metal compound powder whereby a molten crystallization and a mutual diffusion are caused between the substrates and the metal activated by the molten flux.

9 Claims, 4 Drawing Figures

METHOD OF BONDING SUBSTRATES MADE OF METAL OR ALLOY

BACKGROUND OF THE INVENTION

1. Field of the Invention

The present invention relates to a high temperature method of bonding substrates made of a metal or an alloy.

2. Description of the Prior Art

Various bonding methods including welding methods and brazing methods have been known as methods of bonding substrates made of a metal or an alloy.

The method of bonding substrates made of a metal or an alloy at a temperature lower than a melting point of the metal or the alloy are classified into a solid phase bonding method as various welding methods and a brazing method.

In the solid phase bonding method, clean surfaces of substrates made of a metal or an alloy are contacted and closely contacted to atomic distance for imparting cohesive force between atoms. Thus, it is not easy to attain such condition.

The solid phase bonding method is classified into a deformation bonding and a diffusion bonding depending upon each combination of a temperature and a pressure.

The deformation bonding method is to bond mainly by a slip deformation and twinning deformation and it is attained at relatively lower temperature for relatively shorter time under relatively high pressure to give relatively greater deformation.

The diffusion bonding method includes most of the conventional high pressure methods such as gas pressure welding method, contact resistance welding method, ambient temperature pressure welding method, ultrasonic welding method, friction welding method and explosion welding method wherein a diffusion of atoms and a creep deformation are mainly utilized to contact closely the contacted surfaces to bond at relatively high temperature for relatively longer time under relatively lower pressure to give less deformation.

The diffusion bonding method also includes a method of bonding substrates by inserting an insert metal at the bonding part beside the direct welding methods.

The insert metal is usually a metal having high diffusion velocity and a melting point lower than that of a substrate. It is clear that the insert metal is used for improving close contact of surfaces by utilizing its softness and for accelerating the bonding by utilizing its thermal diffusing characteristic, and for reinforcing the bonded surface by forming an alloy, and for increasing a remelting temperature.

The diffusion bonding method is attained under one kind of surface phenomenon and accordingly, the surface condition is important factor.

In order to attain the close contact for a large area under relatively lower pressure and relatively less deformation, the thermal diffusion and the creep deformation characteristics are especially important for bonding them.

On the other hand, according to the definition of International Standarding Organization, a brazing method is defined to a method of bonding substrates by using a molten metal (braze) under utilizing wetting and spreading characteristics on the substrates wherein a melting point of the molten metal is lower than that of the substrate and a brazing is to use a molten metal having a melting point of higher than 450° C. and a soldering is to use a molten metal having a melting point of lower than 450° C., and the melting of the surfaces of the substrates does not constitute the joint.

The meaning of the last definition is considered that the joint for the bonding is not formed by the molten substrates but is formed by a braze. Thus, in the high temperature brazing method for heat resistant alloy, an alloy of the substrate is formed. The definition may be modified.

The disadvantages of the conventional diffusion bonding methods are to require special clean surfaces and smoothness in comparison with the welding methods and the other solid phase bonding methods.

In order to contact closely the surfaces of the substrates, it is necessary to reduce roughness and unevenness of the surfaces of the substrates. The substrates can be bonded at lower temperature under lower pressure depending upon the cleanness and smoothness of the surfaces of the substrates. It is reported to be preferably processing the surface having a roughness of less than about 10.

The surface treatment is usually carried out by a wire brushing or an acid washing. Recently, it has been proposed to treat by glow discharge in an inert gas under a reduced pressure or by an ion plating. The surface treatment should be carried out just before the bonding operation and the bonding characteristic is deteriorated depending upon an aging after the surface treatment. The treated surface should be usually bonded in vacuum, an inert gas or a reducible atmosphere in order to prevent the inactivation of the treated surface.

The other disadvantage of the conventional diffusion welding method is to require relatively high temperature such as about 0.7 $T_M$ ($T_M$: melting point (K°)). The temperature in the welding highly affects to a creep deformation, a diffusion velocity, a dissociation of an oxide and a dissolution of an oxide into the substrate, whereby the temperature is important factor in the diffusion welding method.

As experimental facts, the minimum temperature to attain easy bonding in the solid phase bonding of a metal is about a recrystallizing temperature and the bonding is easily attained at higher than the minimum temperature.

The conventional diffusion bonding is to attain a precise welding whereby it is necessary to prevent a deformation of the substrate and to minimize the pressure. However, the pressure affects to break a surface film and to improve close contact and to promote a diffusion of atoms and a creep deformation. The contradiction to the theory is compensated by the special surface treatment.

A bonding method similar to the brazing method can be considered to overcome the disadvantages of the conventional diffusion bonding methods. Such method is called as Transient Liquid Phase Bonding Method (TLP method) wherein an insert metal having a thickness of less than 0.1 mm and a low melting point is used and the substrates are bonded under light pressure in vacuum or argon gas by heating them. The insert metal is melted at the bonding temperature to fill the gap of the bonding boundary with a thin liquid layer. During the maintenance to the bonding temperature, a mutual diffusion is caused between the liquid insert metal and the substrate and the components in the bonded part are changed by causing an isothermal solidification to bond them. The disadvantage of the TLP method is to melt mutually the liquid insert metal and the substrate at relatively low temperature for a long time.

On the other hand, the disadvantage of the conventional brazing method is to form a strong surface film on the surface of the substrate made of an active metal such as Al, Cr and W or an alloy thereof whereby the bonding property is significantly deteriorated.

SUMMARY OF THE INVENTION

It is an object of the present invention to overcome the disadvantages of the conventional brazing methods.

It is another object of the present invention to provide a novel method of bonding substrates made of a metal or an alloy as a diffusion bonding by heating the substrates with a flux containing a metallic powder or a metal compound powder (metal halide or metal salt).

The foregoing and other objects of the present invention have been attained by providing a method of bonding substrates made of a metal or an alloy which comprises coating a brazing flux incorporating a metallic powder or a metal compound powder, on a surface of the substrate having a melting point of higher than 700° C.; and heating them at a temperature higher than a melting point of the flux but lower than a melting point of the metal of the metallic powder or the metal compound powder whereby a molten crystallization and a mutual diffusion are caused between the substrates and the metal activated by the molten flux.

DETAILED DESCRIPTION OF THE PREFERRED EMBODIMENT

The flux can be commercial fluxes for brazing as shown in Table 1. (fluoride type flux) and also other fluxes such as borate type fluxes containing sodium borate ($Na_2B_4O_7$) or boric acid ($H_3BO_3$); iodide type fluxes and chloride type fluxes.

| | Commercial fluxes for brazing: | |
|---|---|---|
| | Main component | Residual component |
| A | $KBF_4$(30 to 50%) | $B_2O_3$, $Na_2B_4O_7$, $K_2B_4O_7$, KCl, $Li_6B_4O_9$ |
| B | $KBF_4$(30 to 60%) | NaF, LiF, $B_2O_3$ |
| C | $KBF_4$ | $Na_2CO_3$, KF, KCl |
| D | $KBF_4$(30 to 50%) | KCl, NaF, $B_2O_3$ |
| E | $KBF_4$(50 to 70%) | $K_2B_2O_7$ |
| F | $KF . 2H_2O . KBF_4$ | $B_2O_3$, $Na_4B_{10}O_{17} . 5H_2O$, LiCl, $Na_2B_4O_7 . 10H_2O$ |

The metal compound powder incorporated in the flux should have a metal element having lower ionization potential than that of the substrate in the flux such as metal chlorides and metal salts.

One example of the present invention will be further illustrated.

Figure 1:
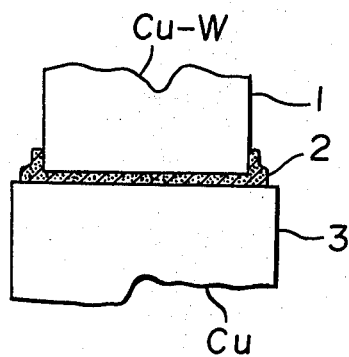
FIG. 1 shows a bonded condition given by a method of one embodiment of the present invention.
Figure 2:
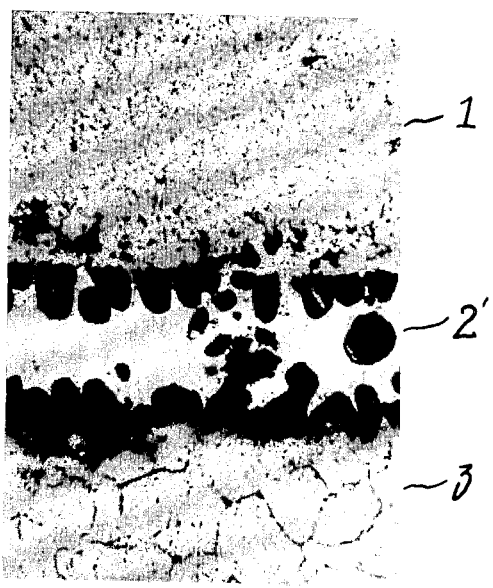
FIG. 2 is a microscopic photography of a sectional surface showing the bonded condition of FIG. 1.

FIG. 1 shows a bonded condition obtained by applying the method of the present invention for bonding a Cu-W sintered alloy (1) and an electrolytic copper (3) and FIG. 2 is a microscopic photography of the sectional surface showing the bonding condition of FIG. 1.

In the bonding of the Cu-W sintered alloy (1) and the electrolytic copper (3) shown in FIG. 1, the bonding surfaces of the substrates (1), (3) are processed by the conventional mechanical processing for a brazing method to form the treated surfaces (less than W 25S).

A mixed flux (2) was prepared by incorporating AgCl powder (as a halide of a metal having lower ionization potential than those of the metals of the substrates) in a molten fluoride type flux (Table 1. F: main component of $KF . 2H_2O$-$KBF_4$-$Na_4B_{10}O_7$) and the mixed flux (2) was coated on the treated surfaces of the substrates (1), (3). The substrates were contacted and heated by a torch in the air at a temperature of 800° C. which is higher than the melting point of the flux but lower than the melting point of Ag (the metal element of AgCl powder) for 1 minute to result the following reaction between the incorporated metal compound and the metals of the substrates.

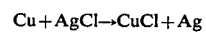

The resulting Ag is an activated metal which was sandwiched between the substrates (1), (3) to contact with the substrates whereby a eutectic crystallization was caused to form Ag-Cu. The melting point of the eutectic crystal was lower whereby the eutectic crystal was melted and Ag-Cu layer was grown to bond the substrates (1), (3).

In this operation, it is preferable to carry out "rubbing operation" by sliding the bonding surfaces of the substrates each other to uniformly react them which is carried out in the conventional brazing operation in order to attain smoothly the melt crystallization and the mutual diffusion on the bonding surface during the heating step.

Suitable pressure (the pressure is to reduce the gap between the bonding surfaces but it does not cause a slip deformation in the diffusion bonding method) can be applied during the heating step to form a smoothly bonded joint. Thus, it is not always necessary in the method of the present invention.

FIG. 2 is a microscopic photography showing the bonded condition attained by the method of the present invention. As it is clear from the drawings, a solid layer (2') made of Ag-Cu was resulted by the reaction and the mutual diffusion of AgCl powder as the additional chloride powder and the Cu-W sintered alloy (1) and the electrolytic copper (3), whereby a joint similar to that of the brazing with a silver flux was obtained.

Figure 3:
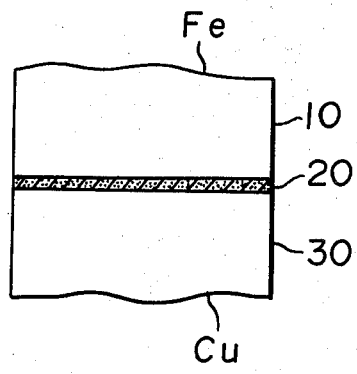
FIG. 3 shows a bonded condition given by the method of the other embodiment of the present invention.
Figure 4:
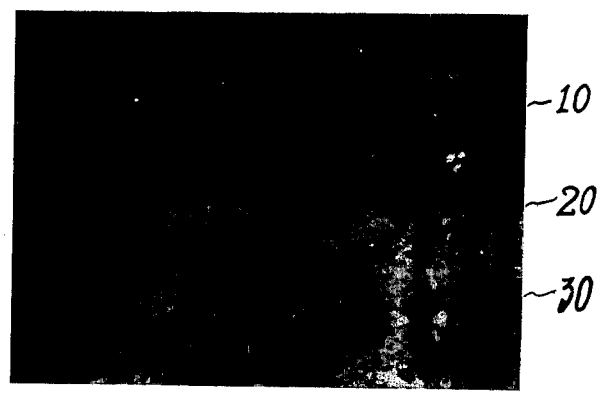
FIG. 4 is a microscopic photography of a sectional surface showing the bonded condition of FIG. 3.

The other example of the present invention will be illustrated, referring to FIGS. 3 and 4.

A Substrate made of a mild steel (10) was bonded to a substrate made of an electrolytic copper (30).

In this example, $CoCl_2$ was used as the metal compound powder added to the flux and the following reaction was resulted by the same method of bonding the Cu-W alloy and the electrolytic copper described above.

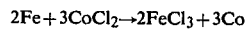

The metallurgical reaction was resulted between the substrates and the activated Co metal whereby the bonding of the substrates was resulted with Co alloy.

FIG. 4 is a microscopic photography showing the bonded condition.

The method of the present invention can be applied to various combinations using various fluxes, metal compounds and substrates beside the above-mentioned examples.

Certain combinations are shown in Table 2.

Table 2

| | Flux for brazing | Metal compound | Substrates M1 | M2 |
|---|---|---|---|---|
| 1 | Commercial brazing flux | AgCl | Cu or Cu alloy | Ag-W Cu-W Fe Stainless steel SUS others |
| 2 | Commercial brazing flux | CuCl | Cu Fe Cu Fe Stainless steel SUS | Ag-W Fe Fe Ni Ni |
| 3 | Commercial brazing flux | CoCl$_2$ | Ag-W Cu-W Ag-W | Cu Cu Fe |

In Table 2, the commercial brazing flux of the fluorate type flux shown in Table 1 is used.

It is also possible to use the other type fluxes such as chloride type flux and borate type flux together with the metal powder or the metal compound powder whose metal has lower ionization potential than those of the metals of the substrates. Thus, the method of the present invention can be applied to all kinds of substrates made of a metal or an alloy.

In the method of the present invention, it is possible to bond in the air advantageously, though it is also possible to bond in a nonoxidizing atmosphere.

In the latter case, there is the advantage that the activity of the flux is remained longer than that of the air.

In accordance with the method of the present invention, the metal powder or the metal compound powder whose metal has lower ionization potential than those of the substrates is incorporated in a flux used in the conventional brazing and the mixed flux is coated on the substrates made of a metal or an alloy having a melting point higher than 700° C. and they are heated at a temperature higher than a melting point of the flux but lower than a melting point of the metal as the metal component of the metal compound powder.

When a metal chloride powder is used, the activated metal (m') is formed by the following reaction.

(1) Substrate (M')+metal(m) chloride $\xrightarrow{heating}$ metal(M') chloride+m'.

when a metal powder is used, the activated metal(m') is formed by the following reaction.

(2) Flux+metal powder(m) $\xrightarrow{heating}$ m'.

The activated metal(m') is sandwiched between the substrates M1 and Ma and the melt crystallization and the mutual diffusion result by the reaction of M1-m' and M2-m' to bond the substrates M1 and M2.

In accordance with the method of the present invention, it is unnecessary to carry out the special surface treatment of the bonding surfaces of the substrates required for the conventional solid bonding method or brazing method, and it is possible to bond in the air by heating to simplify the bonding operation. Moreover, the bonding can be attained for a short time and an expensive braze need not to attain the method of bonding substrates made of a metal or an alloy which has excellent productivity in economical operation.

We claim:

1. A method of bonding metal or metal alloy substrates in air, comprising:
   coating a solid brazing flux containing a powdered metal or powdered metal compound onto the surface of said substrates having a melting point greater than 700° C.; and
   heating said coated substrates to a temperature greater than the melting point of the flux but less than the melting point of the powdered metal or powdered metal compound, whereby molten crystallization and mutual diffusion occurs between metal of the surfaces of the substrates and the activated metal derived from the powdered metal or powdered metal compound containing flux.

2. The method of claim 1 wherein the metal compound powder is a powder of a metal chloride or a metal salt which is convertable into a metal.

3. The method of claim 1 or 2, wherein the brazing flux is a flux having a fluoride, chloride, borate or iodide principal component.

4. The method of claim 1, wherein said metal compouond is silver chloride, copper chloride or cobalt chloride.

5. The method of claim 1, wherein a copper or copper alloy substrate is bonded to a silver-tungsten, copper-tungsten, iron or stainless steel substrate.

6. The process of claim 1, wherein said substrates bonded are:
   copper to silver-tungsten, iron to iron, copper to iron, iron to nickel and stainless steel to nickel.

7. The method of claim 1, wherein said substrates bonded are:silver-tungsten to copper, copper-tungsten to copper and silver-tungsten to iron.

8. The process of claim 1, wherein said brazing flux is based upon potassium tetrafluoroborate, sodium borate, or boric acid.

9. The method of claim 1, wherein the metal atom of said metal compound has an ionization potential less than the components of said flux.

* * * * *